Figure 1:
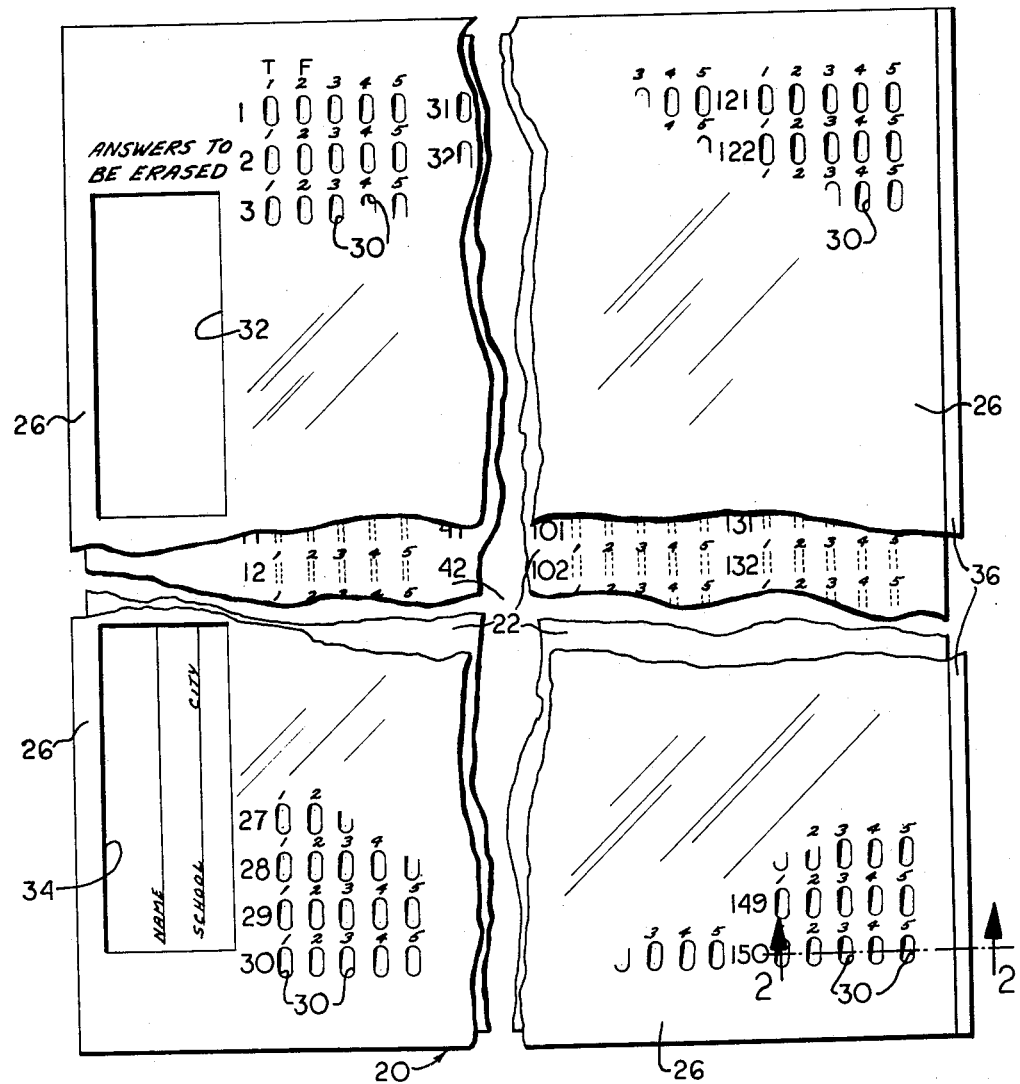

May 14, 1963   R. T. GRAY   3,089,260
ANSWER GUARD
Filed Sept. 26, 1960

INVENTOR.
ROBERT T. GRAY
BY Fulwider, Mattingly
& Huntley
ATTORNEYS

United States Patent Office 3,089,260
Patented May 14, 1963

3,089,260
ANSWER GUARD
Robert T. Gray, 5751 Baja Drive, San Diego, Calif.
Filed Sept. 26, 1960, Ser. No. 58,376
5 Claims. (Cl. 35—48)

The present invention relates to a scoring device and more particularly to a device used by students for recording their answers to test problems.

In practicing the present invention, an answer guard and a multiple choice scoring sheet are employed. The scoring sheet may be of the standard type, having printed thereon problem indicia, usually in consecutive numbers reading downwardly, and having printed thereon a plurality of horizontally disposed indices opposite each of the problem indicia and which are herein referred to as "answer indices." Such answer indices may be in consecutive numbers such as "1, 2, 3, 4, 5" or abbreviations for "true" or "false" or a combination of numbers and abbreviations. The problem for the student may be of such character that it is answerable correctly one way only, for example, the statement in the problem is either true or false, or the problem may state a plurality of numbered statements, and the student must answer the same by making a mark on the score sheet in the position corresponding to the answer that he deems correct.

The answer guard of the present invention is disposed above the scoring sheet. It may be opaque; in which event, there is printed thereon, an exact duplication of the printing that is on the scoring sheet. Or, it may be as herein shown in the form of a transparent sheet whereby the indicia therebelow can be seen readily. In either embodiment it is provided with perforations, one perforation for each answer index with which it is aligned. These perforations are of sufficient width throughout the depth thereof for the extension of a marking device, such as a sharpened pencil, therethrough, and, the thickness of the guard is such that the scoring sections of the sheet can be viewed only in an area substantially directly above the scoring sheet.

In the preferred embodiment of the invention, the guard is provided with downwardly extending ledges adjacent the edges of the guard. These ledges have a depth at least equal to the thickness of the scoring sheet and these ledges are utilized for retaining the scoring sheet in aligned relationship with the perforations in the guard. The upper surface of the guard is rabbeted at all edges to aid in stacking the sheets.

The features and advantages will be apparent from the following description, reference being made to the accompanying drawings wherein a preferred embodiment of the invention is illustrated.

Figure 2:
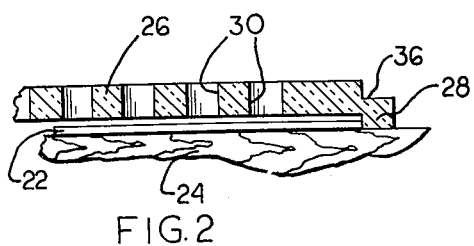

In the drawings:

FIG. 1 is a top plan view, in full scale, of the scoring device, the center parts thereof being broken away to foreshorten the same, part of the guard also being removed so as to show the score sheet therebelow; and FIG. 2 is a fragmentary sectional view taken on line 2—2 of FIG. 1, but on a two to one scale.

Referring more in detail to the drawing, the guard is rectangularly shaped and is shown at 20 and the score sheet at 22. A fragmentary cross-sectional view of a table or desk is shown at 24.

The guard is formed of glass or suitable plastic in the form of a flat, rectangularly shaped sheet 26, with integrally formed and downwardly extending ledges 28 at the four edges. These ledges retain the paper score sheet therebelow in position, as is more clearly shown in FIG. 2. The dimension of the guard between the ledges is slightly larger than the dimension of the score sheet. The guard may be formed of opaque material, in which event there is printed thereon an exact duplication of the printing which is on the scoring sheet. In the form illustrated, the guard is formed of transparent material so that the printing on the score sheet therebelow can be seen readily.

The score sheet 22, or the opaque guard, is provided with indicia in the form of problem numbers, herein shown as 1 to 150, in five vertical rows of thirty each and reading downwardly. Answer indices, preferably five, are disposed alongside of each problem indicia. Other wording such as "name," "school" and "answer to be erased" may be used.

The guard 20 is provided with one hundred and fifty sets of perforations 30, five for each of the answer indicia and preferably directly below the answer indices. These perforations have sufficient width throughout the depth thereof for the extension of a marking device, such as a pencil, therethrough. As an example, the width of these perforations is approximately three thirty-seconds of an inch. Preferably, the perforations are elongated whereby a short line may be inscribed by the student through the perforations. The thickness of the guard and consequently the depth of the perforations is such that the students, who are at desks disposed at the normal distances from one another, cannot visually discern what markings are being made by the next adjacent student. Preferably the guard is at least one-eighth of an inch in thickness.

The guard may be provided also with windows 32 and 34 disposed above other printing. The student can write through these windows. For example under "answers to be erased," the student may desire to change his answer; for example, he may have drawn a line under "2" to problem 3 and now desires to change to answer "5." He merely writes through window 32 "3-2 to 3-5."

The upper surface of the guard is rabbeted at all edges, as shown at 36, for the purpose of aiding the stacking of the same.

It has been found that some students unwittingly are tempted to copy the answer of his immediate neighbor or become confused or unsure of himself when he can see and does see his neighbor student make a mark indicating an answer different from his own. By the present invention, it is apparent that there has been provided a scoring device by which the student is assured that no one can intentionally or unwittingly copy his answer. Such guard of the device is simple in construction and inexpensive.

While the forms of embodiments herein shown and described constitute preferred forms, it is to be understood that other forms may be adopted falling within the scope of the claims that follow.

I claim:

1. In combination, a multiple choice scoring sheet having problem indicia, each having answer indices; a rectangular shaped answer guard disposed above the scoring sheet, said guard having perforations aligned with each answer index of sufficient width throughout the depth of the guard for the extension of a marking device therethrough, said guard being sufficiently thick to allow said scoring sections of the scoring sheet to be viewed only in an area substantially directly above said scoring sheet; and means for retaining said scoring sheet below the guard in proper registry, both longitudinally and laterally, with the perforations in the guard, said means consisting of ledges extending downwardly from the guard at the four extreme edges thereof, said ledges having a depth at least equal to the thickness of the scoring sheet.

2. A combination as defined in claim 1, in which the guard is at least one-eighth of an inch thick.

3. A combination as defined in claim 1, in which the guard is formed of transparent material.

4. A combination as defined in claim 1, in which the guard is formed of opaque material with printing thereon in exact duplication of that of the score sheet.

5. A combination as defined in claim 1, in which the upper surface of the guard is rabbeted at all edges.

References Cited in the file of this patent

UNITED STATES PATENTS

| | | |
|---|---|---|
| 1,682,686 | Rutherford | Aug. 28, 1928 |
| 1,915,653 | Dutton | June 27, 1933 |
| 1,928,565 | Kindig | Sept. 26, 1933 |
| 2,228,331 | Warner | Jan. 14, 1941 |
| 2,503,130 | Portiz | April 4, 1950 |
| 2,525,837 | Simplair | Oct. 17, 1950 |
| 3,054,196 | Durham | Sept. 18, 1962 |